United States Patent [19]

Nawa et al.

[11] Patent Number: 5,489,391

[45] Date of Patent: Feb. 6, 1996

[54] COOLANT COMPOSITIONS WITH P-TERT-BUTYLBENZOIC ACID OR SALT

[75] Inventors: Nobuyuki Nawa, Gifu; Hideki Goto, Ichinomiya, both of Japan

[73] Assignee: C C I Co. Ltd., Gifu, Japan

[21] Appl. No.: 962,520

[22] Filed: Oct. 16, 1992

[30] Foreign Application Priority Data

Oct. 18, 1991 [JP] Japan ............... 3-270793

[51] Int. Cl.⁶ ............................................. C09K 5/00
[52] U.S. Cl. ................... 252/75; 252/76; 252/73; 252/79
[58] Field of Search ................... 252/75, 76, 73, 252/79

[56] References Cited

U.S. PATENT DOCUMENTS

| | | | |
|---|---|---|---|
| 4,324,675 | 4/1982 | Barthold et al. | 252/79 |
| 4,389,371 | 6/1983 | Wilson et al. | 252/75 X |
| 4,402,907 | 9/1983 | Clark | 252/79 X |
| 4,450,088 | 5/1984 | Wilson et al. | 252/75 |
| 4,501,667 | 2/1985 | Cook | 422/7 X |
| 4,588,513 | 5/1986 | Triebel et al. | 252/79 X |
| 4,647,392 | 3/1987 | Darden et al. | 252/75 |
| 4,759,864 | 7/1988 | Van Neste et al. | 252/75 |
| 4,770,803 | 9/1988 | Forsberg | 252/75 |
| 4,851,145 | 7/1989 | Van Neste et al. | 252/76 |
| 4,946,616 | 8/1990 | Falla et al. | 252/75 |

FOREIGN PATENT DOCUMENTS 4117481  4/1992  Japan .

*Primary Examiner*—Douglas J. McGinty
*Attorney, Agent, or Firm*—Thomas R. Vigil; James P. Hanrath

[57] ABSTRACT

A heat exchange inhibitor composition, characterized in that phosphates, amine salts, silicates, borates or nitrites are not necessary, and further characterized in that p-tert butyl benzoic acid and/or an alkali salt or salts thereof and a triazole are contained therein, which provides improved inhibitive abilities against metal corrosion, glycol oxidation and plugging of the circulation passages of a heat exchange system and further provides improved stability in hard water without forming chemical depositions and does not produce nitrosamines or form gel with other salts in the heat exchange fluid.

13 Claims, No Drawings

COOLANT COMPOSITIONS WITH P-TERT-BUTYLBENZOIC ACID OR SALT

BACKGROUND OF THE INVENTION

The invention relates to coolant inhibitor compositions for use in fluid heat exchange systems predomninantly for, but not limited to, internal-combustion engines, and more particularly the invention relates to coolant inhibitor compositions which have an improved metal corrosion inhibitive function and an oxidative coolant deterioration inhibitive function leading to inhibition of corrosion of metal parts in heat exchange systems predominantly for, but not limited to, internal-combustion engines which may be otherwise caused by said oxidative coolant deterioration.

Most conventional heat exchange fluids for use in cooling systems for internal-combustion engines contain corrosion inhibitors such as phosphates, amine salts, silicates, borates, and/or nitrites to inhibit corrosion of various metal parts in the cooling system, however, such heat exchange fluids have shortcomings.

When a heat exchange fluid containing phosphates enters a river, lake, etc., the phosphates tend to increase BOD and/or COD levels therein, which can lead to proliferation of algae, which in turn can lead to the generation of hazardous pollutants.

Further, phosphates contained in a conventional heat transfer fluid tend to chemically react with hard water components coexisting in the fluid and form chemical depositions, which often lead to degradation of the corrosion inhibitive function of the fluid and can lead to plugging of the circulation passages in the heat exchange system.

Amine salts contained in a conventional heat exchange fluid can produce nitrosamines by chemically reacting with nitrites in the fluid or in another fluid when blended together in the cooling system. Nitrosamines are a carcinogenic substance.

Silicates contained in a conventional fluid are relatively unstable and have a tendency to polymerize when there are changes in temperature and/or pH values in the fluid and/or when other salts coexist, often leading to degradation of the corrosion inhibitive function of the fluid.

Borates contained in a conventional fluid tend to corrode aluminum and aluminum alloy parts of the heat exchange system.

Nitrites contained in a conventional fluid degrade quickly under actual use, therefore quickly degrading the corrosion inhibitive function of the fluid.

Japanese Patent Kokai (published unexamined) No. 2-182782/1990 discloses a heat exchange fluid which does not contain phosphates, amine salts, silicates, borates, or nitrites, but includes a $C_7$–$C_{14}$ linear dicarboxylic acid and a triazole. The fluid has an improved metal corrosion inhibitive function and is relatively stable in hard water.

Said Japanese Patent Kokai No. 2-182782/1990, however, is not without a shortcoming. The aliphatic dibasic acid (linear-dicarboxylic acid) contained in said heat exchange fluid and aliphatic monobasic acids in general, which are widely used as metal corrosion inhibitors, gradually degrade the glycols used in the fluids by oxidation, resulting in a lowering the pH value of the fluid and in turn resulting in the promotion of corrosion of the metal parts in the heat exchange system.

Accordingly, it is an object of the present invention to provide heat exchange fluid compositions which possess an excellent metal corrosion inhibitive property, good stability in hard water and a long duration period in a cooling liquid, as well as an improved oxidation degradation inhibitive property.

SUMMARY OF THE INVENTION

A coolant inhibitor composition of the present invention can use, but is not be limited to, a glycol as a chief component, water, 0.5 to 5.0 wt. % of p-tert butyl benzoic acid and/or an alkali salt or salts thereof, and 0.05 to 1.0 wt. % of a triazole, without the need to contain any phosphates, amine salts, silicates, borates, nitrites, aliphatic monobasic acids, or aliphatic dibasic acids. However, the addition of these and other inhibitors in small quantity is not outside the scope of the present invention.

The addition of less than 0.5 wt. % of p-tert butyl benzoic acid and/or an alkali salt or salts thereof does not provide effective metal corrosion inhibition and the addition of more than 5 wt. % does not provide a significant increase in metal corrosion inhibition; however, increased concentration may be utilized to produce concentrated forms of inhibitor to be further diluted before use.

The addition of less than 0.05 wt. % of a triazole does not provide effective metal corrosion inhibition and the addition of more than 1.0 wt. % does not provide a significant increase in metal corrosion inhibition; however, again, increased concentration may be used to produce inhibitor concentrate to be further diluted before use.

The following benefits are provided by the present invention.

1. Glycol, when used in a coolant composition of the present invention, reduces the freezing point of a cooling liquid.
2. A coolant composition of the present invention if containing no aliphatic monobasic acids or aliphatic dibasic acids does not promote glycol oxidation, thus extending the effective life of the coolant composition as a metal corrosion inhibitor.
3. P-tert butyl benzoic acid and/or an alkaline salt or salts thereof will work to inhibit corrosion of metal parts of a cooling system, especially iron containing parts and/or aluminum containing parts, and dissolve hard water components in the cooling liquid where the coolant composition of the present invention is used, eliminating the formation of depositions in the circulation passages of the cooling system.
4. The triazole contained in a coolant inhibitor composition of the present invention inhibits corrosion of metal parts in a cooling system, especially copper parts and aluminum parts of the cooling system.
5. A coolant composition of the present invention need not contain amine salts or nitrites and therefore does not form nitrosamines which are a carcinogenic substance.
6. A coolant composition of the present invention need not contain phosphates and therefore does not generate planktons in rivers, lakes, etc.., when the coolant composition of the present invention enters such a place. The coolant composition does not form depositions in chemical reaction with components of coexistable hard water because of the absence of phosphates in the coolant composition.
7. A coolant composition of the present invention need not contain silicates and therefore does not form gel when other salts coexist.
8. A coolant composition of the present invention need not contain berates and therefore inhibits corrosion of aluminum containing parts in a cooling system.

BRIEF DESCRIPTION OF THE TABLES

TABLE 1 shows components in wt. % of embodiment coolant compositions 1, 2, and 3 of the present invention, conventional cooling agent 4, and comparative cooling agents 5, 6, and 7.

TABLE 2 shows the results of tests for oxidative degradation of glycols using embodiment coolant compositions 1, 2, and 3 of the present invention, conventional cooling agent 4, and comparative cooling agents 5, 6, and 7.

TABLE 3 shows a result of tests for metal corrosion according to JIS Standards using embodiment cool ant compositions 1, 2, and 3 of the present invention, conventional cooling agent 4 and comparative cooling agents 5, 6, and 7.

TABLE 4 shows a result of tests for stability in hard water using embodiment coolant compositions 1, 2, and 3 of the present invention, conventional cooling agent 4 and comparative cooling agents 5, 6, and 7 as samples.

DETAILED DESCRIPTION OF THE PREFERRED EMBODIMENT

The present invention is described more in detail using several embodiments as compared with a conventional cooling agent and comparative cooling agents with the help of the attached Tables 1 to 4, however, the present embodiments are considered as illustrative and not restrictive, the scope of the present invention being indicated by the appended claims rather than by the description hereafter and all changes which come within the meaning and range of equivalence of the claims are therefore intended to be embraced therein.

The compositions of Embodiments (embodiment cool ant compositions) 1 to 3, Conventional (conventional cooling agent) 4, and Comparatives (comparative cooling agents) 5 to 7 are given below.

Embodiment 1

The coolant composition of Embodiment 1 comprises ethylene glycol, p-tert butyl benzoic acid, sodium benzoate, a benzotriazole, sodium nitrate, and water.

Embodiment 2

The coolant composition of Embodiment 2 comprises ethylene glycol, p-tert butyl benzoic acid, a tolyltriazole, and water.

Embodiment 3

The coolant composition of Embodiment 3 comprises ethylene glycol, p-tert butyl benzoic acid, sodium benzoate, a benzotriazole, and water.

Conventional 4

The cooling agent of Conventional 4 comprises ethylene glycol, sebacic acid and dodecanedioic acid which are alphatic dibasic acids, a benzotriazole, and water.

Comparative 5

The cooling agent of Comparative 5 comprises ethylene glycol, 2-ethylhexoic acid as an aliphatic monobasic acid, a benzotriazole, and water.

Comparative 6

The cooling agent of Comparative 6 comprises ethylene glycol, p-tert butyl benzoic acid, sodium benzoate, a benzotriazole, and water, whereas the benzotriazole content in wt. % is the same as the benzotriazole content in Embodiment 1, while the p-tert butyl benzoic acid content in Comparative 6 is smaller than that in Embodiment 1.

Comparative 7

The cooling agent of Comparative 7 comprises ethylene glycol, p-tert butyl benzoic acid, a benzotriazole, and water, whereas the p-tert butyl benzoic acid content in wt. % is the same as the p-tert butyl benzoic acid content in Embodiment 3, while the benzotriazole content in Comparative 7 is smaller than that in Embodiment 3.

The pH values of all the samples, Embodiments 1 to 3, Conventional 4, and Comparative 5 to 7, are adjusted to between 7 and 8 by sodium hydroxide.

Coolant compositions according to the present invention may contain, if desired, an antifoam agent and/or a coloring agent, as well as other known corrosion inhibitors such as, but not limited to, a molybdate, a tungstate, a sulfate, a mercaptobenzothiazole, or an alkali salt or salts thereof.

The chief component of a glycol, if utilized, can be ethylene glycol, propylene glycol, 1, 3-butylene glycol, hexylene glycol, diethylene glycol, or glycerol, among which ethylene glycol or propylene glycol is most preferredly used. The present invention is not restricted to use with a glycol base. Water, alcohols, or any other means to introduce the invention in the heat exchange system is also acceptable and falls within the scope of the present invention.

All the above samples were tested and compared. The test results are explained below.

Oxidation Inhibition Tests

The tests were conducted using a testing device according to JIS Standards. All of the tested coolants (500 ml undiluted solution each), Embodiments 1 to 3, Conventional 4 and Comparatives 5 to 7, were put into beakers (1,000 ml) separately.

Then dry air was continuously blown into each beaker at a rate of 100 ml/min. for 400 hrs., the beakers being kept at 120° C. Table 2 shows the results of the tests. Each pH value was taken from its 30% water diluted solution after the solution had been heated for 5 hrs. at 100° C. and cooled. The products formed when the glycols in the samples were oxidized were measured in formic acid equivalent by ion chromatography.

Corrosion Tests

The tests were conducted according to JIS Standards. All of the tested coolants, Embodiments 1 to 3, Conventional 4, and Comparatives 5 to 7, were diluted to 30 vol. % with water prepared by dissolving 148 mg of $Na_2SO_4$, 165 mg of NaCl and 138 mg of $NaHCO_3$ in 1,000 ml of distilled water. The test metals were castaluminum, cast iron, steel, brass, solder, and copper. The test results are shown in Table 3.

Stability Tests

All of the tested coolants, Embodiments 1 to 3, Conventional 4, and Comparatives 5 to 7, were diluted to 50 vol. % with hard water comprised of deionized water and $CaCl_2$ such that $Ca^{2+}$ became 400 ppm with the total hardness of 1000 ppm in $CaCO_3$ equivalent. The diluted solutions were left at room temperature in darkness for 24 hrs., and the formed depositions were measured in vol. %. The test results are shown in Table 4.

The test results are evaluated below. Embodiments 1, 2, and 3

As can be seen in Table 2, the pH values for Embodiments 1, 2, and 3 were not lowered significantly and the products formed by oxidation were less than those in the other samples, showing that Embodiments 1 to 3 were superior in inhibiting oxidation. As can be seen in Table 3, Embodiments 1, 2, and 3 were better in metal corrosion inhibition of the cast aluminum, cast iron, steel, brass, solder, and copper. Also, as can be seen in Table 4, Embodiments 1 to 3 were very stable in hard water.

Conventional 4

As can be seen in Table 3, Conventional 4 showed some corrosion inhibitive ability, however, as can be seen in Table 2, the pH value of Conventional 4 rapidly decreased and the sample formed much oxidation product, showing that Conventional 4 promoted glycol oxidation. This can be attributed to the fact that Conventional 4 contained sebacic acid and dodecanedioic acid. Further, as can be seen in Table 4, Conventional 4 showed poorer stability in hard water, which can be attributed to the fact that Conventional 4 contained a large amount of dodecanoic acid but contained no p-tert butyl benzoic acid.

Comparative 5

As can be seen in Table 3, Comparative 5 showed some corrosion inhibitive ability and as can be seen in Table 4, Comparative 5 was rather stable in hard water however, as can be seen in Table 20 the pH value of Comparative 5 reduced rapidly and Comparative 5 formed a large quantity of oxidation products, showing that Comparative 5 promoted glycol oxidation, which can be attributed to the fact that Comparative 5 contained ethylhexoic acid an aliphatic monobasic acid.

Comparative 6

As call be seen in Table 2, Comparative 6 was rather good in inhibiting glycol oxidation and as can be seen in Table 4, Comparative 6 was rather stable in hard water, however, as can be seen in Table 3, Comparative 6 corroded the cystaluminum, cast iron, and steel, showing that Comparative 6 was poor in corrosion inhibitive ability against some metals, which can be attributed to the fact that Comparative 6 did not contain enough p-tert butyl benzoic acid.

Comparative 7

As can be seen in Table 2, Comparative 7 was rather good in glycol oxidation inhibition, and as can be seen in Table 4, Comparative 7 was rather stable in hard water, however, as can be seen in Table 3, Comparative 7 corroded brass, solder and copper, showing that Comparative 7 was poor in corrosion inhibitive ability against some metals, which can be attributed to the fact that Comparative 7 did not contain enough triazole.

Effects of the Invention

As can be understood from all the Tables 1 to 4 and the foregoing description, the coolant compositions of the present invention possess the following effects.

A coolant composition of the present invention including 0.5 to 5.0 wt. % of p-tert butyl benzoic acid and/or an alkali salt or salts thereof and 0.05 to 1.0 wt. % of a triazole is excellent in corrosion inhibition and very stable in hard water.

The best coolant compositions of the present invention do not contain aliphatic monobasic acids or aliphatic dibasic acids, and inhibit glycol oxidation and metal corrosion, resulting in very durable coolant compositions.

The best coolant compositions of the present invention do not contain phosphates, amine salts, silicates, borates or nitrites, and therefore:

a) do not form nitrosamines, a dangerous carcinogenic substance;

b) do not pollute rivers, lakes, etc. biochemically, when the coolant compositions eventually enter such a place;

c) do not form depositions in hard water, thus eliminating plugging of the circulation passages of a cooling system;

d) do not form gel when encountering other salts in the cooling fluid; or e) do not corrode aluminum or aluminum alloys.

TABLE 1

| | Components (wt. %) | | | | | | |
|---|---|---|---|---|---|---|---|
| | Embodiments | | | Conventional | Comparatives | | |
| | 1 | 2 | 3 | 4 | 5 | 6 | 7 |
| sebacic acid | | | | 4.0 | | | |
| dodecanedioic acid | | | | 1.0 | | | |
| ethylhexoic acid | | | | | 2.0 | | |
| p-tert butyl benzoic acid | 2.0 | 4.0 | 1.5 | | | 0.3 | 1.5 |
| sodium benzoate | 1.0 | | 3.0 | | | 3.0 | |
| benzotriazole | 0.3 | | 0.8 | 0.3 | 0.3 | 0.3 | 0.01 |
| tolyltriazole | | 0.5 | | | | | |
| sodium nitrate | 0.5 | | | | | | |
| sodium hydroxide | 0.46 | 0.91 | 0.35 | 2.7 | 0.58 | 0.12 | 0.35 |
| water | 2.5 | 3.6 | 3.2 | 3.5 | 3.1 | 2.8 | 3.4 |
| ethylene glycol | 93.24 | 90.99 | 91.15 | 88.50 | 94.02 | 93.48 | 94.74 |
| pH (30 vol. %) | 7.8 | 7.6 | 7.8 | 7.5 | 8.2 | 7.5 | 7.3 |

TABLE 2

| | Oxidative Deterioration Test | | | | | | |
|---|---|---|---|---|---|---|---|
| | Embodiments | | | Conventional | Comparatives | | |
| | 1 | 2 | 3 | 4 | 5 | 6 | 7 |
| Changes pH | −1.50 | −1.80 | −1.90 | −3.70 | −3.10 | −1.60 | −1.90 |
| Products (ppm) | 9300 | 9800 | 11200 | 37500 | 24300 | 9500 | 10300 |

TABLE 3

| | JIS K 2234-1987 No. 2 | Embodiments 1 | Embodiments 2 | Embodiments 3 | Conventional 4 | Comparatives 5 | Comparatives 6 | Comparatives 7 |
|---|---|---|---|---|---|---|---|---|
| Metal Corrosion Tests (JIS Standards) Changes in Weight (mg/cm$^2$) | | | | | | | | |
| Cast Aluminum | ±0.30 | −0.06 | −0.18 | −0.03 | −0.02 | −0.25 | −0.57 | −0.21 |
| Cast Iron | ±0.30 | +0.02 | +0.01 | −0.01 | −0.01 | −0.10 | −1.25 | −0.05 |
| Steel | ±0.15 | 0.00 | −0.01 | 0.00 | +0.01 | −0.08 | −0.98 | −0.03 |
| Brass | ±0.15 | −0.04 | −0.05 | −0.04 | −0.07 | −0.04 | −0.09 | −0.87 |
| Solder | ±0.30 | −0.06 | −0.04 | −0.07 | −0.08 | −0.07 | −0.26 | −1.05 |
| Copper | ±0.15 | −0.08 | −0.06 | −0.06 | −0.05 | −0.03 | −0.12 | −0.56 |
| pH after testing | 7.0 ~ 11.0 | 7.6 | 7.5 | 7.8 | 7.4 | 7.8 | 7.1 | 6.7 |
| Appearances of Plates and Solutions after testing | | normal | normal | normal | normal | normal | Aluminium Alloy partly corroded Iron Alloy & Steel partly corroded | Solder rough surface appeared |

TABLE 4

| | Embodiments 1 | Embodiments 2 | Embodiments 3 | Conventional 4 | Comparative 5 | Comparative 6 | Comparative 7 |
|---|---|---|---|---|---|---|---|
| Hard Water Stability Tests | | | | | | | |
| Deposition (vol. %) | 0.00 | 0.00 | 0.00 | 0.89 | Below 0.05 | Below 0.05 | 0.00 |

What is claimed is:

1. A coolant composition consisting essentially of a glycol or glycols as a base, water, 0.5 to 5.0 wt. % of at least one of p-tert butyl benzoic acid or an alkali salt or salts thereof, and 0.05 to 1.0 wt. % of a triazole.

2. The coolant composition of claim 1, which does not include any phosphates, amine salts, silicates, borates, or nitrites.

3. The coolant composition of claim 1, wherein said triazole is a benzotriazole.

4. The coolant composition of claim 1, wherein said triazole is a tolyltriazole.

5. The coolant composition of claim 1, wherein said glycol is an ethylene glycol.

6. The coolant composition of claim 1, wherein said glycol is a propylene glycol.

7. The coolant composition of claim 1 further consisting essentially of 1.0 to 3.0 wt. % sodium benzoate.

8. The coolant composition of claim 1 further consisting essentially of at least 0.5 wt. % sodium nitrate.

9. The coolant composition of claim 1 the pH value of which is adjusted to between 7.0 and 8.0.

10. The coolant composition of claim 1 further consisting essentially of 1.0 to 3.0 wt. % sodium benzoate and at least 0.5 wt. % sodium nitrate.

11. The coolant composition of claim 1 further consisting essentially of an effective amount of an antifoam agent.

12. The coolant composition of claim 1 further consisting essentially of an effective amount of a coloring agent.

13. The coolant composition of claim 1 further consisting essentially of one or more corrosion inhibitors selected from the group of a molybdate, a tungstate, a sulfate, a mercaptobenzothiazole, or an alkali salt or salts thereof.

* * * * *